US005701252A

United States Patent [19]

Facchin et al.

[11] Patent Number: 5,701,252

[45] Date of Patent: Dec. 23, 1997

[54] DISTRIBUTION NETWORK SYSTEM FOR PRODUCTS AND INFORMATION

[76] Inventors: Daniela Facchin, Contra' Zanella, 6-36100, Vicenza, Italy; Paola Frau, Via Dal Pozzo, 75-36100, Vicenza, Italy

[21] Appl. No.: 591,667

[22] PCT Filed: Aug. 1, 1994

[86] PCT No.: PCT/EP94/02549

§ 371 Date: Jan. 30, 1996

§ 102(e) Date: Jan. 30, 1996

[87] PCT Pub. No.: WO95/04333

PCT Pub. Date: Feb. 9, 1995

[30] Foreign Application Priority Data

Aug. 2, 1993 [IT] Italy .................................. VI93A0134

[51] Int. Cl.[6] .................................................. G06F 17/00

[52] U.S. Cl. .......................................... 364/479; 235/381

[58] Field of Search .............................. 235/381; 221/88; 364/479

[56] References Cited

U.S. PATENT DOCUMENTS

| | | | |
|---|---|---|---|
| 4,546,240 | 10/1985 | Imamichi | 235/379 |
| 4,674,055 | 6/1987 | Ogaki et al. . | |
| 4,803,348 | 2/1989 | Lohrey et al. . | |
| 4,896,024 | 1/1990 | Morello et al. . | |
| 5,091,713 | 2/1992 | Horne et al. . | |

FOREIGN PATENT DOCUMENTS

| | | |
|---|---|---|
| 0 537 756 A2 | 10/1992 | European Pat. Off. . |
| 2 110 450 | 11/1982 | United Kingdom . |
| 2 254 469 | 10/1992 | United Kingdom . |
| WO 91/20046 | 12/1991 | WIPO . |

*Primary Examiner*—Harold Pitts

*Attorney, Agent, or Firm*—Watson, Cole, Stevens, Davis

[57] ABSTRACT

The invention is a distribution network system of automatic dispensers of products and information interconnected with one another and with at least a host computer, where homogeneous groups of dispensers are suitable for exchanging information, by means of said host computer, with each dispenser connected with it and with the network node that is connected with each host computer by means of telephone lines and is provided with a transceiver section suitable for getting through to each dispenser by radio, through an antenna or a communication satellite.

2 Claims, 2 Drawing Sheets

DISTRIBUTION NETWORK SYSTEM FOR PRODUCTS AND INFORMATION

BACKGROUND OF THE INVENTION

The invention concerns a distribution network system of dispensers of products and services, more particularly a network of dispensers interconnected with each other through a telematic connection accomplished by means of a telephone or radio line and of a communication satellite system or by radio.

Automatic dispensers of products are known which are operated by the user by means of coins or credit cards or electronic cards.

One of the most widespread automatic dispenser is for distributing banknotes,

This machine is stocked with banknotes to be dispensed; the machine is provided with an electronic device that is able to read the magnetic card inserted by the user and to communicate with the master computer that checks the electronic card inserted.

After checking, the machine enables the user to require a sum varying within a minimum and a maximum fixed in advance. Once the user has chosen, a device counting the banknotes starts working and subsequently a dispenser conveys the selected amount of money to the outlet of the machine.

Similar machines are described in GB-A-2110450 which discloses a system for performing transactions by one or more dispenser units, without giving information about the availability of money in other dispenser when in the dispenser used the money is not available.

GB-A-2254469 discloses a multiple user-operated data-controlled machine connected to a common remote interactive data store whereby data for operational use by an individual machine is retrieved from the remote store.

Other types of less complex machines are conceived so that by inserting an electronic card or coins a certain product can be selected. The product is chosen by means of a keyboard and is then distributed through a special drawer. One of these machines is the coffee machine or the confectionery dispenser.

In the case of all these types of machines, if they don't have the required product available, they cannot comply with the user's request and neither can they inform the user about the nearest machine that can satisfy such a request.

SUMMARY OF THE INVENTION

The aim of the invention is to go beyond the limits of the automatic dispensers that have been described below.

One of the purposes to be achieved is the implementation of an interconnected distribution network of automatic dispensers, so that if the product the user wants to get from a certain dispenser isn't available there, the user can be informed about the location of the nearest automatic dispenser where the required product is available.

Another aim to be achieved is the possibility of distributing different products, even of different sizes and belonging to different marketing categories, by means of the automatic dispenser that is the object of the invention.

Another purpose to be achieved is to carry out an interconnection among automatic dispensers so that every automatic dispenser can inform the user about the possibility of finding the required products that are not available where they have been requested and can also give other kinds of information, both by asking the main storage of the computer that controls the interconnected distribution network and by means of the linkage with Data Banks, a linkage that is accomplished on-line by the user and is payed for by directly debiting a credit card or by using a prepaid card.

Another aim to be achieved is to enable the manager of the interconnected network to bring up to date the stock of each product in each automatic dispenser on real-time and also to update the prices of the products, when necessary. A further aim is to implement the automatic dispenser belonging to the network so that it can also take back the articles hired by the user, such as videocassettes, CD or other things, and at the same time carry out the necessary accounting operations like the cancellation of the item from the user's stock and the record in the stock of the dispenser.

All these aims and others that will be better explained later have been achieved by a method for dispensing products contained in automatic dispenser belonging to a distribution network system.

According to the invention, each automatic dispenser is connected, preferably through telephone linkage, with a host computer that examines the requests coming from each dispenser when the latter is not able to comply with requests of products that are not available or when the user asks for information instead of products.

Once the host computer has received the piece of information from the automatic dispenser, it gets through to the network node by means of the telephone line and the network node transmits the whole information to a communication satellite. In turn the satellite transmits the information to teach automatic dispenser of the network, which receives it by radio through a parabolic antenna. Once the information has been examined, the answer is released from the automatic dispensers the other way round, namely from the host computer connected with the dispensers to the node, then again to the satellite which transmits the information to the dispenser that has asked the question.

Owing to the interconnection among the individual dispensers and also to the fact that each dispenser can be connected with external networks by means of the communication satellite, it is obvious that each dispenser can work as a terminal for the on-line linkage with Data Banks. Consequently, the user will be allowed to require information which will first be dealt with by the host computer and then transmitted by the node to a host computer exterior to the network through the satellite, a host computer that will be able to supply the required information, for example, concerning market quotations, foreign currencies and the like.

According to the invention, each dispenser will also be able to take back the articles hired by the user, since it is conceived so that the means for dispensing and taking the products can operate even inversely, namely they can take up the object placed by the user in a given area, which can also be the dispensing area itself, and put the object in the store of the dispenser again, at the same time loading its electronic memory.

BRIEF DESCRIPTION OF THE DRAWINGS

Further distinctive features and peculiarities of the invention in question will be better highlighted in the description of an application, chosen among many, of the network and of the method employed to accomplish it, illustrated in the attached table in a schematic way.

DESCRIPTION OF THE INVENTION

Request for a product available in the dispenser

Figure 1:
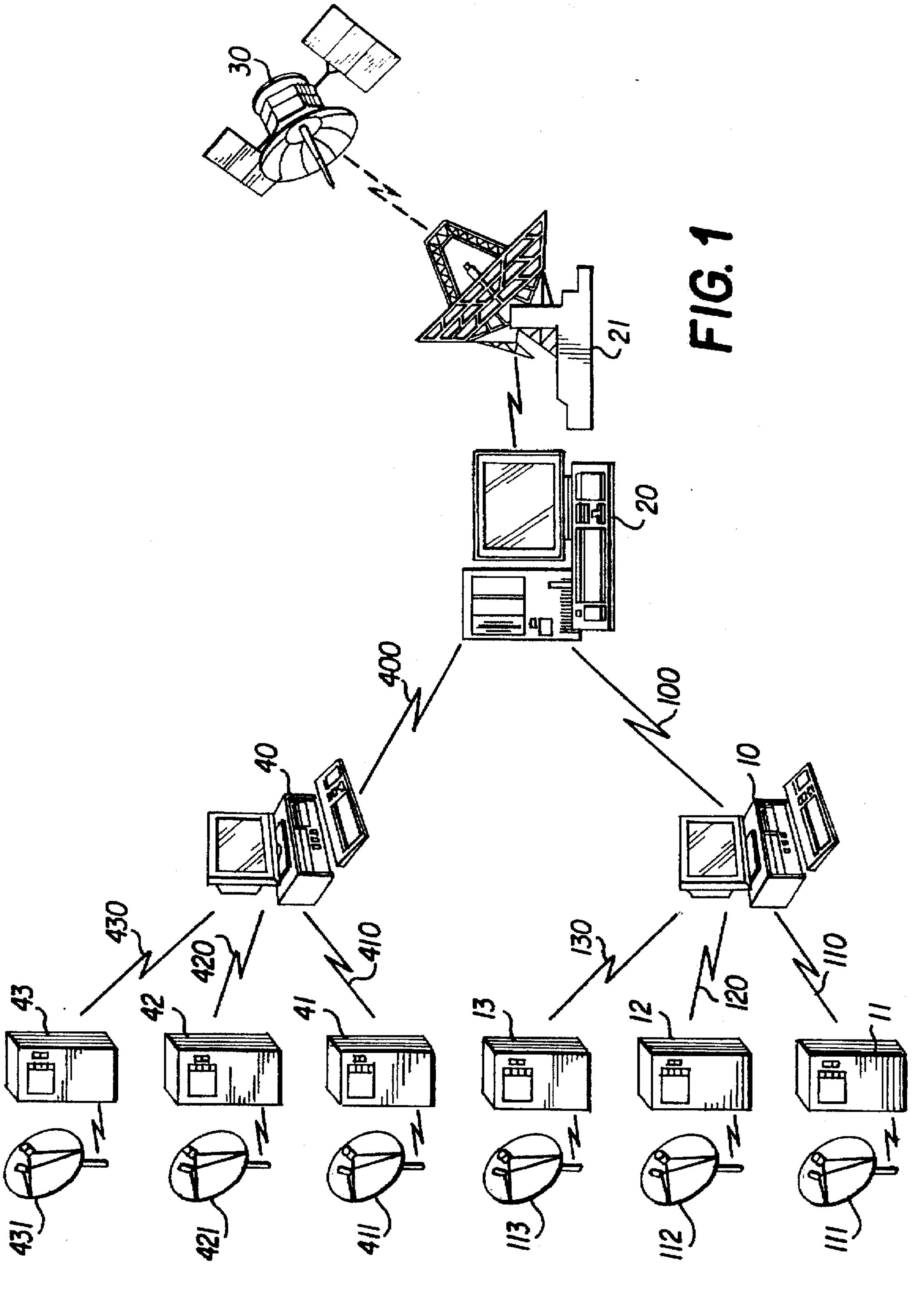
FIG. 1 shows the interconnection among the automatic dispensers of products and information and the interconnecting network.

With reference to the FIG. 1 the numbers 11, 12 and 13 represent the automatic dispensers belonging to a first group, referred to as a whole with A, and connected by means of a telephone line, for example with protocol X28, with a host computer, referred to with 10, which is able to process the information transmitted by each of the automatic dispensers. Likewise, the automatic dispensers 41, 41 and 43 are connected by means of telephone lines, with protocol X28 too, with a host computer 40.

Each of the automatic dispensers, which will not be described in detail since they are substantially made up following known technology, has in its inside one or more stores consisting in hive-shaped or organized spaces suitable for containing the products to be dispensed. Said spaces can be of different sizes or can be vary in such a way as to hold different products, like, for example, videocassettes, roll films, compact-disks or others. Each automatic dispenser is provided with means for taking each product, which are operated by the choice of the user who, upon acceptance after inserting the identification card, can choose the products to select on a video screen.

The choice of the products can be made by the user in different ways, for example by means of a keyboard, of a joy-stick or of a touch-screen.

Once the computer inside the automatic dispenser has received the piece of information concerning the product to be taken, said computer compares it to that existing in its storage and transmits the order concerning the position in which the suitable mean has to be placed in order to take the selected product.

This way the means for taking the product positions itself so as to face the compartment out of which the product has to be taken and by means of clasping items, such as pliers, the product is taken and subsequently conveyed to the outlet of the automatic dispenser. At this point the means for identifying the selected product and the means for reading such identification go into operation so as to report that a unit of a certain product has been taken and to cancel the presence of such a product from the store. The operation ends when the product is conveyed into the distribution drawer of the automatic dispenser, upon debiting the operation to the user's account by credit card or upon the withdrawal of the same amount from a prepaid card.

The operation described above concerns the choice and the taking of a product chosen by the user and available in the automatic dispenser itself. This kind of operation cannot substantially be distinguished from other known operations. The situation changes if the user asks for a product that is not available in the automatic dispenser where the request is made, or if the user asks for information instead of products. These two different cases will be dealt with below.

Request for a product not available in the dispenser where the request is made

If the user, who, for example, interacts on the automatic dispenser 11, asks for a product that is not available in said automatic dispenser, the storage and processing systems present in the automatic dispenser 11 transfers the piece of information to the host computer, referred to with 10, through the telephone line, referred to with 110, with protocol X28. The information is dealt with and transferred, through the telephone line 100 with protocol X25, from the host computer 10 to the network node 20. The means 21 for transmission by radio pass the piece of information from the network node 20 to the satellite 30. The satellite 30 passes the information on by transmitting it to all the paraboloids, both to those of the users' group A, namely 111, 112, 113, and to the paraboloids relevant to the automatic dispensers of group B, namely to paraboloid 411 of dispenser 41, paraboloid 421 of dispenser 42 and paraboloid 431 of dispenser 43.

If one or more automatic dispensers have the required product available, they transfer the information back to the host computer with which they are connected through a telephone line and from each of these computers to the satellite 30, which transmits the piece of information by ether to the dispenser 11, from which the request came.

The screen of the automatic dispenser 11 displays the information regarding the availability of the product: for example, it can indicate that the nearest dispenser in which the user can find the required product is in a certain street of the same town or in the nearest town. If the user confirms the booking, the product is booked and the user can go to the dispenser 12, for example, in order to take what has been reported to be available there.

Figure 2:
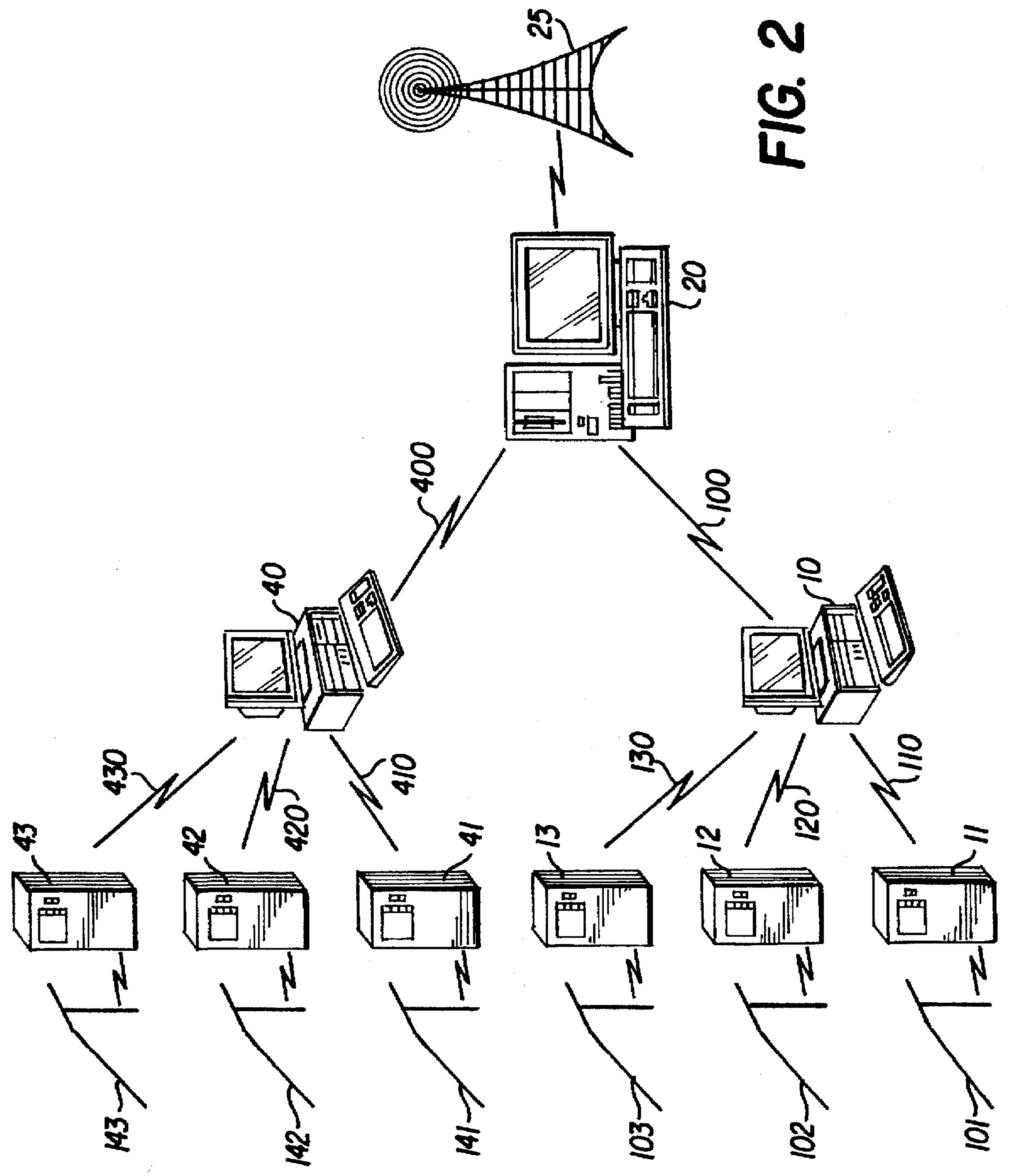
FIG. 2 shows a variant of the interconnection among the dispensers belonging to the network.

FIG. 2 shows a variant of the interconnection network where the network node 20 is equipped with a radio antenna 25 that transmits directly to the antennas 101, 102 and 103 of the dispensers of the first group and to the antennas 141, 142, 143 of the dispensers of the second group. This kind of connection is suitable for interconnecting dispensers scattered on a comparatively small geographical area.

One of the obvious advantages ensuing from the interconnection accomplished by means of a network of automatic dispensers contrived according to the invention is the fact that, with particular reference to automatic dispensers located in different places in the same town, it is possible to have a minimum quantity of goods in store and consequently to optimize the quantity of products available without increasing storage expenses. Furthermore, it is thus possible to comply with the user's request in the best way.

Request for information from the user

The intercommunicating network of automatic dispensers that is the object of the present invention can be used to accomplish the distribution not only of products, but also of information.

For example, information regarding data could be available, held in the Data Banks belonging to host computers that are not part of the network.

In this case the request made, for example, by the automatic dispenser 12 through the telephone channel 120 reaches the host computer 10, which deals with the piece of the information and transmits it to the network node 20 with protocol X25 through line 100. The host computer 10 is provided with a modem, by means of which it can get in connection with the network node 20 through the telephone line 100; further, through said node it can connect itself with the Data Banks that are interconnected with the network node by means of the communication satellite 30 that communicates with the host computer and the modem.

This way from any automatic dispenser any kind of information can be required, both belonging to the internal Data Banks of the host computer 10 and to the external Data Banks that are connected by the host computer 10 by modem, as stated above.

Naturally, once the information has been delivered, the transaction ends and the user is charged with the service: the charging operation is displayed on the screen of the automatic dispenser 12 or is printed, if the dispenser is provided with a printer.

As it is clear from what has been described up to now, the interconnection that takes place by means of a network of automatic dispensers able to exchange information with one another, both within the same subgroup and with other subgroups through the network node and by radio, antenna or satellite, optimizes the distribution of the products and allows the managers of the network to know the whole situation of each dispenser of the network at any moment and therefore to restock the dispensers with the products of which they are short, if necessary.

Moreover, the network system that is the object of the invention also allows to direct the user to the nearby dispensers, if the dispenser is short of the required product or it allows the user to book the item he is interested in.

Besides, the information is an additional service distributed by the network by means of the interconnection of the automatic dispensers with Data Banks that can be both inside or outside the system.

We claim:

1. A method for dispensing products contained in automatic dispensers belonging to a distribution network systems, wherein said dispensers comprise:

A) a plurality of automatic dispensers each of which includes:
   - organized spaces suitable for containing the products to be dispensed;
   - means for taking a selected product and conveying it out of the store;
   - a system for the positioning of said means;
   - tools fixed to the conveying means, suitable for taking hold of the selected product and for releasing it;
   - reading means for the identification of the selected product;
   - primary storage systems for storing and processing the information regarding the stored items;
   - secondary storage systems for managing the information received from the user or from the network with which the dispenser is connected;
   - means for the identification of magnetic cards or semiconductor cards;
   - means for connecting each dispenser and a host computer;
   - wireless means for connecting each dispenser to a host computer;
   - means for displaying information;
   - means for printing the information required;

B) at least a host computer connecting said plurality of automatic dispensers, each of which being connected to a network node by telecommunication means, said method comprising:
   - a step in which a dispenser checks if a user's card is enabled to take products;
   - a step in which the products that can be selected are displayed on the video screen of said dispenser;
   - a step in which the user chooses the product he wants;
   - a step in which the dispenser checks if the product is available and, if so, takes it and delivers it to the user; characterized in that said steps are followed by:
     - a step in which the request is passed from a dispenser to other dispensers connected with the network by means of the host computer through a communication satellite, if the required product is not available in said dispenser;
     - a step in which the answer concerning the place where the required product is available is displayed and/or printed, said piece of information concerning the place where the required product is available being transmitted by the communication satellite to the dispenser from which the request came;
     - a step in which the cost of the product is debited, if the product has been delivered.

2. The method according to claim 1, characterized in that the distribution network system comprises information services which are distributed by the following steps:
   - a step in which the dispenser checks if the user's card is enabled to receive information;
   - a step in which the offered services are displayed on the screen;
   - a step in which the user chooses the service he is interested in;
   - a step in which the dispenser is linked by cable to the host computer with which it is connected;
   - a step in which the request is processed by the host computer and the storage files belonging to said computer are checked;
   - a step in which the answers coming from the remote host are transmitted by cable from the host computer to the dispenser; said answers are distributed through the satellite to the network node and subsequently to the host computer to which the dispenser that has made the question belongs;
   - a step in which the required piece of information is displayed and printed.

* * * * *